United States Patent [19]

Annas, Sr, et al.

[11] Patent Number: 4,853,067

[45] Date of Patent: Aug. 1, 1989

[54] TACK STRIP PADDING APPLICATOR

[75] Inventors: Dulin L. Annas, Sr., Hickory; Richard M. Teague, Taylorsville, both of N.C.

[73] Assignee: TSA, Inc., Hickory, N.C.

[21] Appl. No.: 213,627

[22] Filed: Jun. 30, 1988

[51] Int. Cl.⁴ .............................................. B32B 31/18
[52] U.S. Cl. ..................................... 156/351; 156/353; 156/355; 156/362; 156/510; 156/522; 156/540
[58] Field of Search ............... 156/353, 351, 354, 355, 156/362, 510, 522, 540

[56] References Cited

U.S. PATENT DOCUMENTS

| | | | |
|---|---|---|---|
| 2,248,744 | 7/1941 | Cohen | 156/353 |
| 2,574,181 | 11/1951 | Hess | 156/353 |
| 2,721,670 | 10/1955 | Sheniyo | 156/353 |
| 3,564,901 | 8/1951 | Hess | 156/353 |
| 3,892,618 | 7/1975 | Griebat | 156/353 |

*Primary Examiner*—Caleb Weston
*Attorney, Agent, or Firm*—Roy B. Moffitt

[57] ABSTRACT

An apparatus for applying an adhesive padding to a tack strip substrate composed of the following elements: (a) a conveyor for conveying a substrate along an elongated path; (b) an arm disposed above the conveyor, pivotable about an axis, biased to a first position, disposed so that the arm comes in contact with the substrate as the substrate is being conveyed along the elongated path by the conveyor, and adapted to be moved from a first position to a second position when brought in contact with the substrate; (c) a feeding device, disposed over the conveyor, for feeding to the substrate along a first path an adhesive strip and removing a removable backing therefrom along a second path; (d) a cut-off device having a movable part for cutting said adhesive strip, the movable part adapted to be moved from a first position above the substrate to a second position below the substrate and biased to the first position; (e) an activator connected to the movable part of the cut-off device and adapted to momentarily move the movable part from its first to its second position by applying a force thereto in response to the arm being returned to its first position and thereafter releasing the force, thereby permitting the movable part to return from its second to its first position; and, (f) a drive mechanism and a clutch, the drive mechanism in mechanical engagement with the clutch, the clutch normally not in engagement with the feeding device, but adapted to be placed in mechanical engagement therewith, the clutch being responsive to the arm being moved from its first to its second position to become engaged with the feeding device.

24 Claims, 10 Drawing Sheets

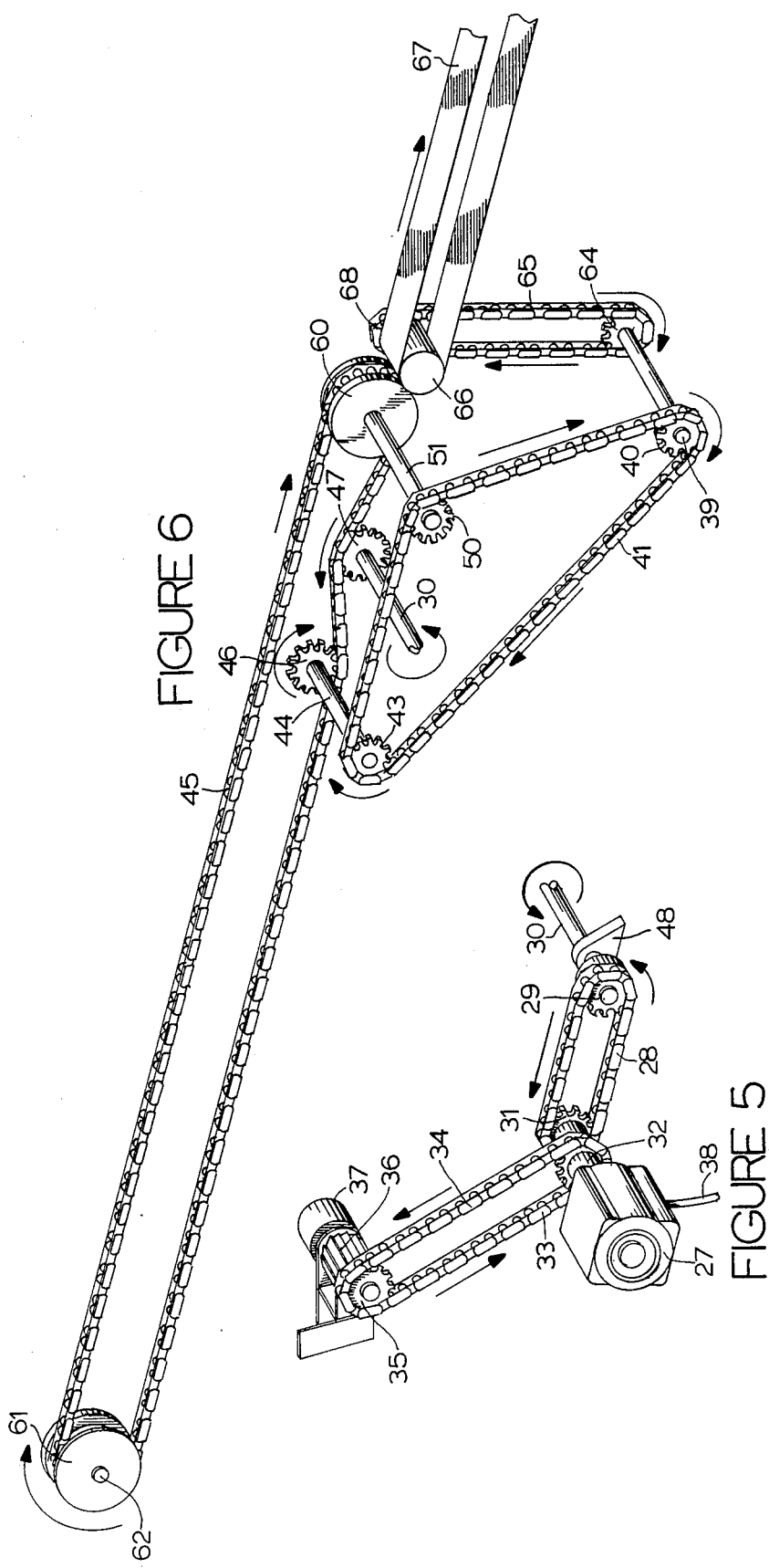

4,853,067

TACK STRIP PADDING APPLICATOR

BACKGROUND OF THE INVENTION

This invention relates to the upholstered furniture industry, more particularly, a metal tack strip coated with a strip of foam used by this industry to secure upholstering material to a wood frame. Referring to FIGS. 1 and 2, there is shown by element 1 of FIG. 1, a prior art metal tack strip having a metal substrate portion 2 and a plurality of protruding members 3. Upholstering furniture craftsmen use such a tack strip 1 to engage the upholstering cloth to a furniture frame, usually made of wood, by wrapping a terminal portion of upholstering cloth around tack strip 1 with protrusions 3 extending through the cloth and then driving protrusions 3 into the appropriate wood portion of the frame. This is usually done with a hammer, which sometimes results in the metal substrate 2 cutting through the upholstering cloth, resulting in poor furniture quality. To solve this problem, it is a prior art practice to affix by hand foam rubber tape 4 to metal substrate 2. Foam tape 4 is an adhesive strip composed of a foam tape 5, removable backing 6, and an adhesive (not shown) disposed therebetween. Backing 6 is removed and foam type 5 is then adhesively affixed to the uppermost surface of substrate 2, resulting in the assembled tack strip 7 shown in FIG. 2. Attached foam tape 5 has the propensity to protect the upholstering cloth from the top edges of substrate 2 especially when element 7 is being hammered into place on a furniture frame after first being wrapped in a terminal portion of upholstering cloth.

Affixing tape 4 to tack strip 2 by hand is slow and expensive. It would be desirable to have a machine that would manufacture the tack strip assembly 7 from the metal tack strip 2 and an indefinite length of tape plus backing 4 and sever tape 4 at a point coincident with the terminal edge of metal tack strip 1. It is towards the solution of this problem that the instant invention is directed.

BRIEF DESCRIPTION OF THE INVENTION

The invention is a tack strip padding applicator, more particularly an apparatus for applying an adhesive padding to a tack strip. The invention is composed of the following elements: (a) a conveyor for conveying a substrip along an elongated path; (b) an arm disposed above the conveyor, pivotable about an axis, biased to a first position, disposed so that the arm comes in contact with the substrate as the substrate is being conveyed along the elongated path by the conveyor, and adapted to be moved from a first position to a second position, when brought in contact with the substrate; (c) a feeding device disposed over the conveyor, for feeding to the substrate along a first path, an adhesive strip for removing a removable backing from the adhesive strip along the second path; (d) a cut-off device having a movable part for cutting said adhesive strip, the movable part adapted to be moved from a first position above the substrate to a second position below the substrate and biased to a first position; (e) an activator connected to the movable parts of the cut-off device adapted to momentarily move the movable part from its first to its second position by applying a force thereto in response to the arm being returned from its second to its first position and thereafter releasing the force, thereby permitting the removable part to return from its second to its first position; and (f) a drive mechanism and a clutch, the drive mechanism being a mechanical engagement with the clutch, the clutch not normally in engagement with the feeding device, adapted to be placed in mechanical engagement therewith and responsive to the arm being moved from its first to its second position, to become engaged with the feeding device.

BRIEF DESCRIPTION OF THE DRAWINGS

FIGS. 5, 6, and 7 are partial perspective views of the drive mechanism and conveyor of the invention.

DETAILED DESCRIPTION OF THE INVENTION

Figure 1:
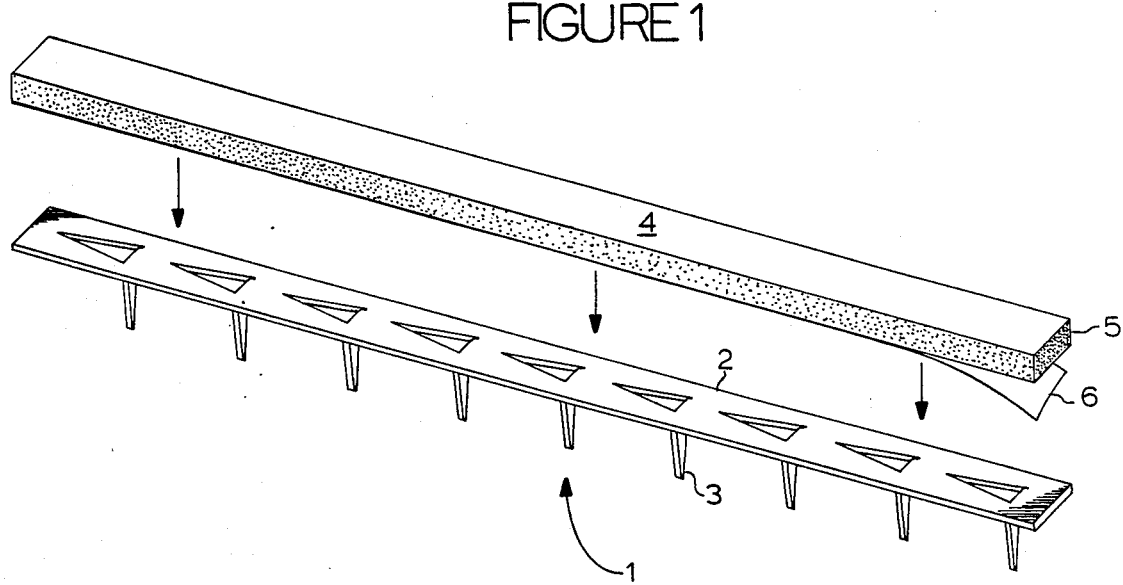
FIG. 1 is a perspective view of a metal tack strip and a strip of padding material (foam tape, plus backing) to be applied to the uppermost surface of the metal tack strip.
Figure 2:
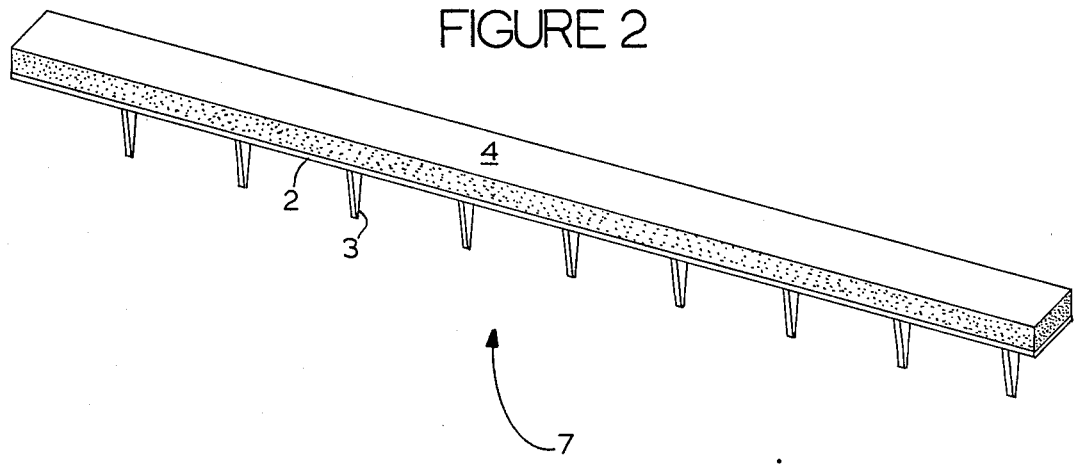
FIG. 2 is a perspective view of an assembled tack strip comprising a combination of the foam tape (backing removed) adhered to the metal tack strip of FIG. 1.
Figure 3:
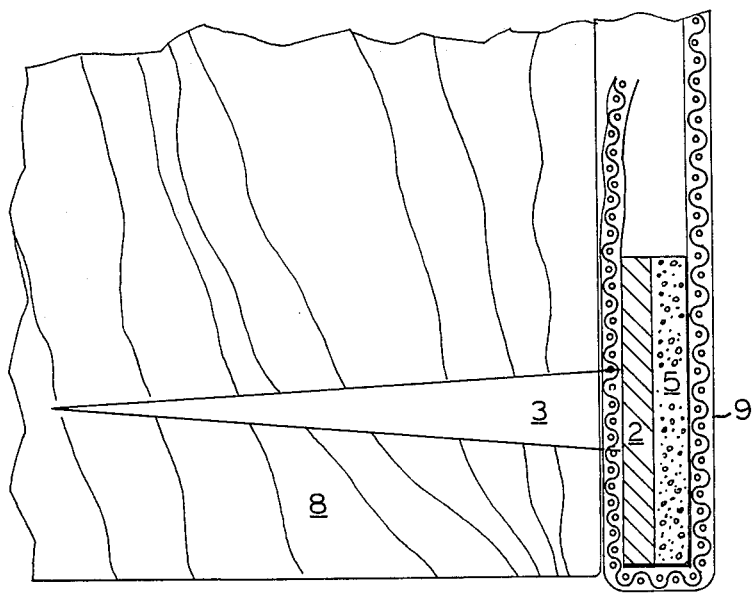
FIG. 3 is a fragmented cross section of the tack strip of FIG. 2 wrapped around a terminal portion of upholstering cloth to form an assembly and the assembly affixed to a furniture wood frame.

A description of the elements shown in FIGS. 1 and 2 have already been discussed and will not be repeated. The finished (coated) tack strip, i.e., the combination 7 shown in FIG. 2, is taken and around it wrapped a terminal edge portion 9 of upholstering cloth. This combination is then affixed usually by a rubber hammer to a wooden substrate 8, a frame used to build upholstering furniture, the foam 5 protecting the upholstering cloth 9 from the metal substrate 2. As previously stated, the object of the invention was to manufacture the combination of foam and metal substrate (as shown by element 7) by a machine and avoid the prior art hand assembly.

Figure 4:
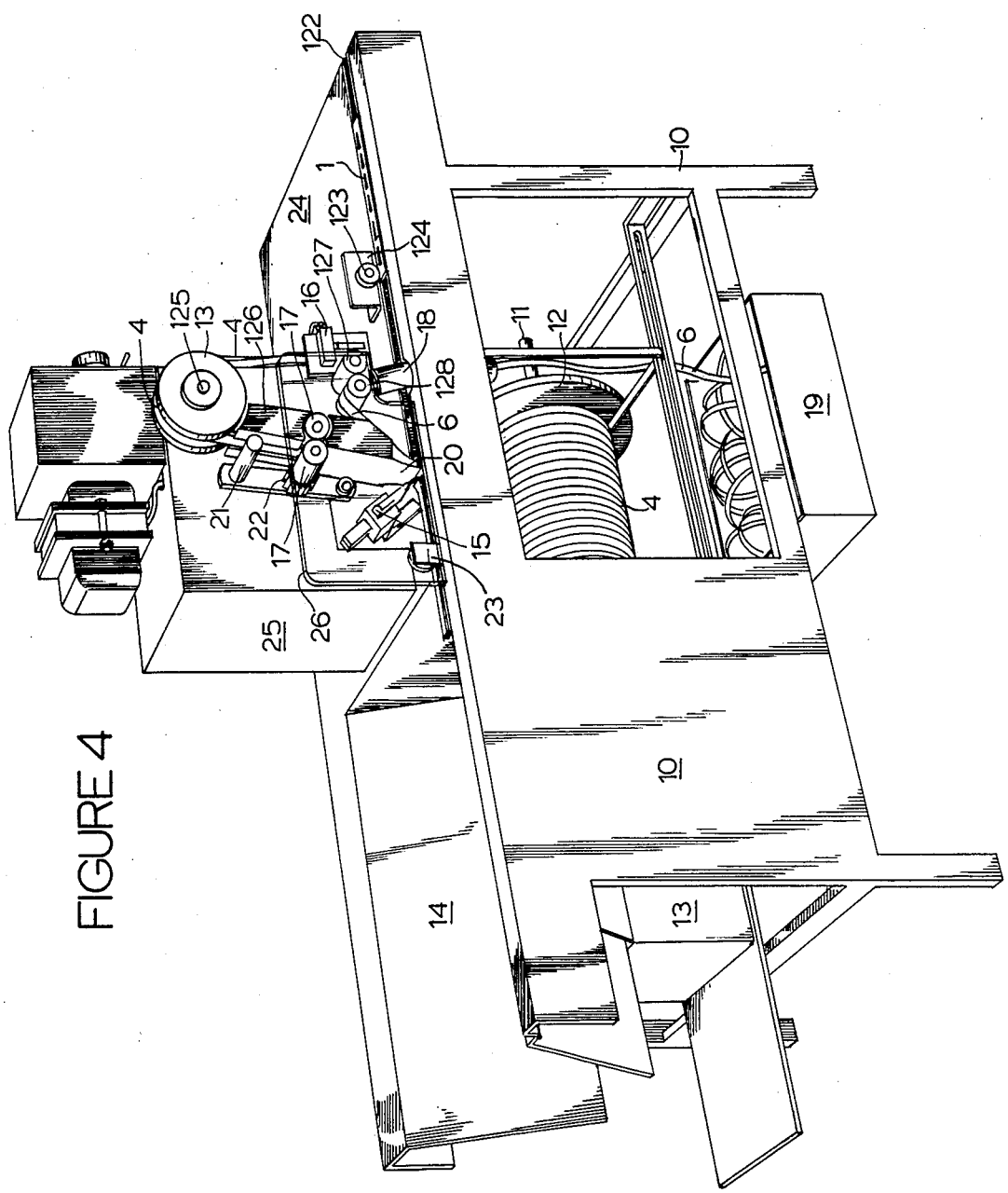
FIG. 4 is a perspective overall view of the invention.

The machine to accomplish this end is shown as a preferred embodiment in FIG. 4. It is composed of frame 10 having a chute-like member 14 on one and a platform 24 on the other terminal portion. Below chute 14 is box 13 which is used to receive the finished product 7 as it is manufactured. Product 7 is manufactured along an assembly line that moves from right to left. Uncoated tack strips 2 are placed on conveyor 45 (see FIG. 6), which travels in slot 122. Tack strip 2 travels under roller 123, which is journaled in stand-up member 124, passes under feeding apparatus 20 and 126, where tape 5 is stripped of its backing 6, applied to tack strip 2 and then cut off by cut off device 15. The finished product 7 is then conveyed to conveyor 67, then stripped from conveyor 67 by remover 23 and deposited through chute 14 into box 13.

Tape 4 in strip form is wound on reel 12, which is disposed on axle 11, and is positioned below table 24. On upstanding housing 25, there is disposed facing member 26 on which safety switch 16 is affixed. Above safety switch 16 is idler roller 13, rotatably journaled on axle 125. Tape 4 is threaded through safety switch 16 and over idler roller 13 into a feeding device made up of two spaced apart members, 126 and 20. In between elements 126 and 20 are two side-by-side feed rollers 17, adapted to be driven by element 37 through clutch 36, as hereinafter more fully explained. This feeding device also includes pivot arm handle 21 and stripping rollers 128-127. Foam tape 4, as it comes off of reel 12, comprises a strip of foam 5, an adhesive (not numbered) on one side of the foam and a backing strip 6 on top of the adhesive. As the foam tape 4 comes round pulley 13, down element 126 and element 20, it does so in groove 155 in elements 126 and 20 over which there is disposed plate 170 in FIGS. 7, 8, and 9. Backing strip 6 is threaded over the lower-most terminal edge of element 20, then along the bottom of element 20 to stripping rollers 128 and 127, then down through guide tube 18 into receptacle 19, disposed below reel 12. After tack strip 2 has passed under feeding means 20 and the foam tape 4 with the backing strip 6 removed and is placed onto the uppermost surface of tack strip 2, then foam strip is cut off by cutting device 15, in a manner hereinafter explained. Subsequently, the completed assembly 7 is then conveyed, as previously explained, onto conveyor 67, then to remover 23, into chute 14 into box 13.

Figure 7:
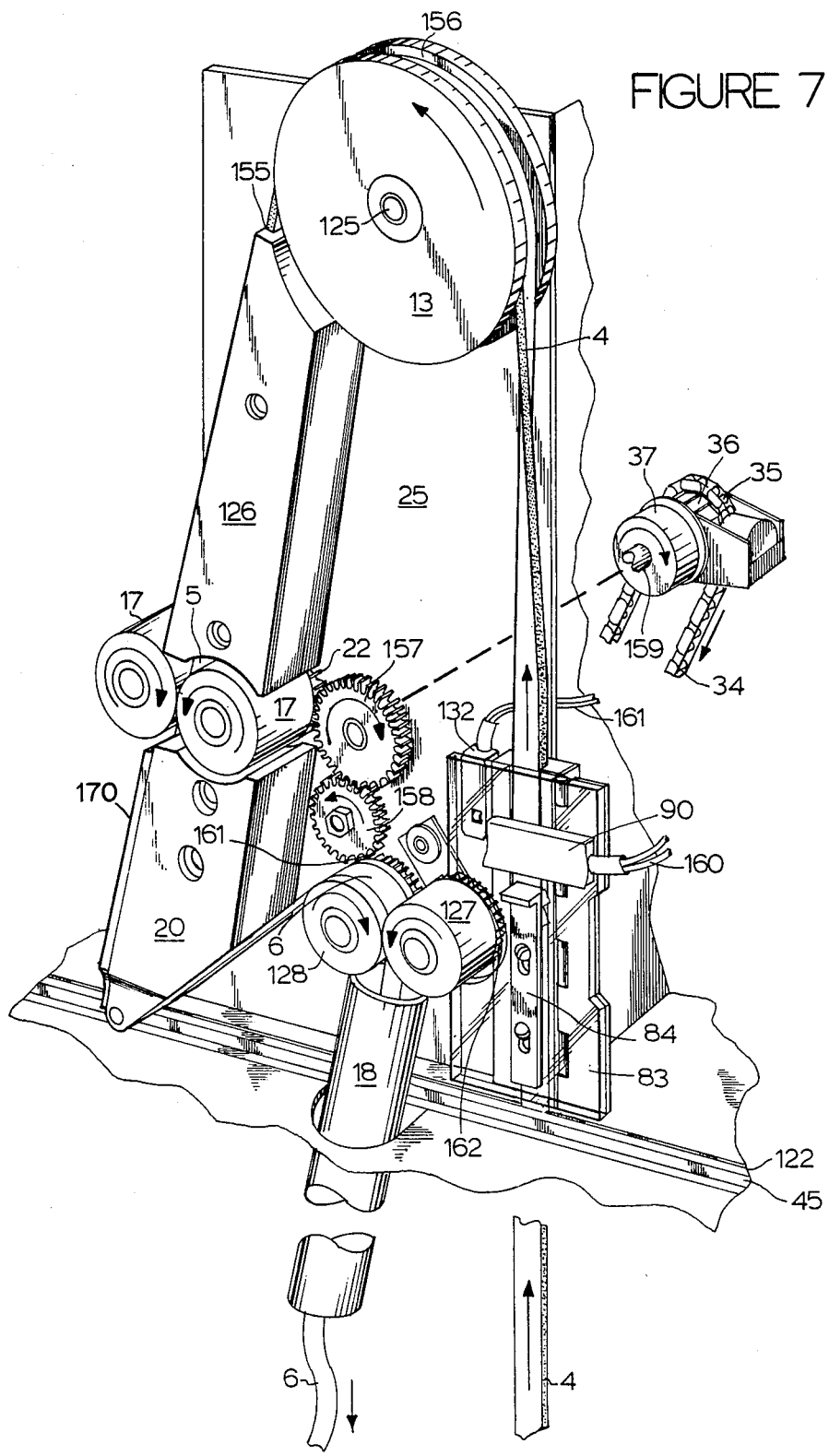

Attention now is directed to FIG. 5, 6, and 7, which describes the drive mechanism for the invention. Apart from knife 75, the moving parts of the invention are driven by motor 27, which is connected to a source of electrical power through line 38. Motor 27 drives axle 32 affixed to sprocket 33, which is threaded onto chain 34. Chain 34 is threaded over sprocket 35, which is affixed to clutch 36. Clutch 36 is attached to drive means 37 and axle 159, which drive rollers 22 and 17.

Viewing for a moment FIG. 7, it will be appreciated that drive means 37 drives axle 159. Axle 159 is affixed to the gear 157 and gear 157 is engaged with gear 158 and drives same. Gear 158 is engaged with gear 161, which drives stripping roller 128. Gear 161 is meshed with gear 162, which is affixed to drive stripping roller 127. Gear 157 is meshed with gear 22 which is affixed to feed roller 17 and thus drives same. It will be appreciated that both feed rollers 17 have a gear 22 on their respective reverse side and both of such gears are engaged with one another so that the driving of one will also drive the other. Pulley 13 has a groove 156 in its outer peripheral surface and elements 126 and 20 have a slot 155 therein in which tape 4 travels. In element 20, slot 155 is covered by cover means 80.

Clutch 36 is a prior art device known as a wrap spring clutch made by the Warner Electric Braking Clutch Company, 449 Garden Street, South Beloit, Ill., 61080, under the lot number of SA500-H1-CCW-115 V. The clutch is activated by the activation of clutch solenoid 102 shown in FIGS. 12 and 13.

Drive shaft 30 is journaled in pillow bearing 48 and is affixed to drive sprocket 47. Drive sprocket 47 is threaded in chain or conveyor 45, which is threaded around sprockets (not shown) in pulleys 60 and 61. Pulley 61 is journaled on axle 62 and pulley 60 is journaled on axle 51. Sprocket 46 is threaded in conveyor or chain 45 and affixed to axle 44, which is affixed to sprocket 43. Sprocket 43 is threaded onto chain 41, which is threaded over sprocket 50 and 40. Sprocket 40 is affixed to axle 39, which is affixed to sprocket 64. Sprocket 64 is threaded onto chain 65 which is threaded over sprocket 68. Sprocket 68 drives pulley member 66. Conveyor 67 (an endless belt) is threaded over terminal pulley member 66 and another terminal pulley (not shown) spaced down stream therefrom. Power on motor 27 is on all the time, except when it is shut down for emergency reasons through safety or master switches that will be later explained. When clutch solenoid 102 (FIG. 11) is activated power is provided to feed rollers 17 as well as stripping rollers 127 and 128.

Figure 8:
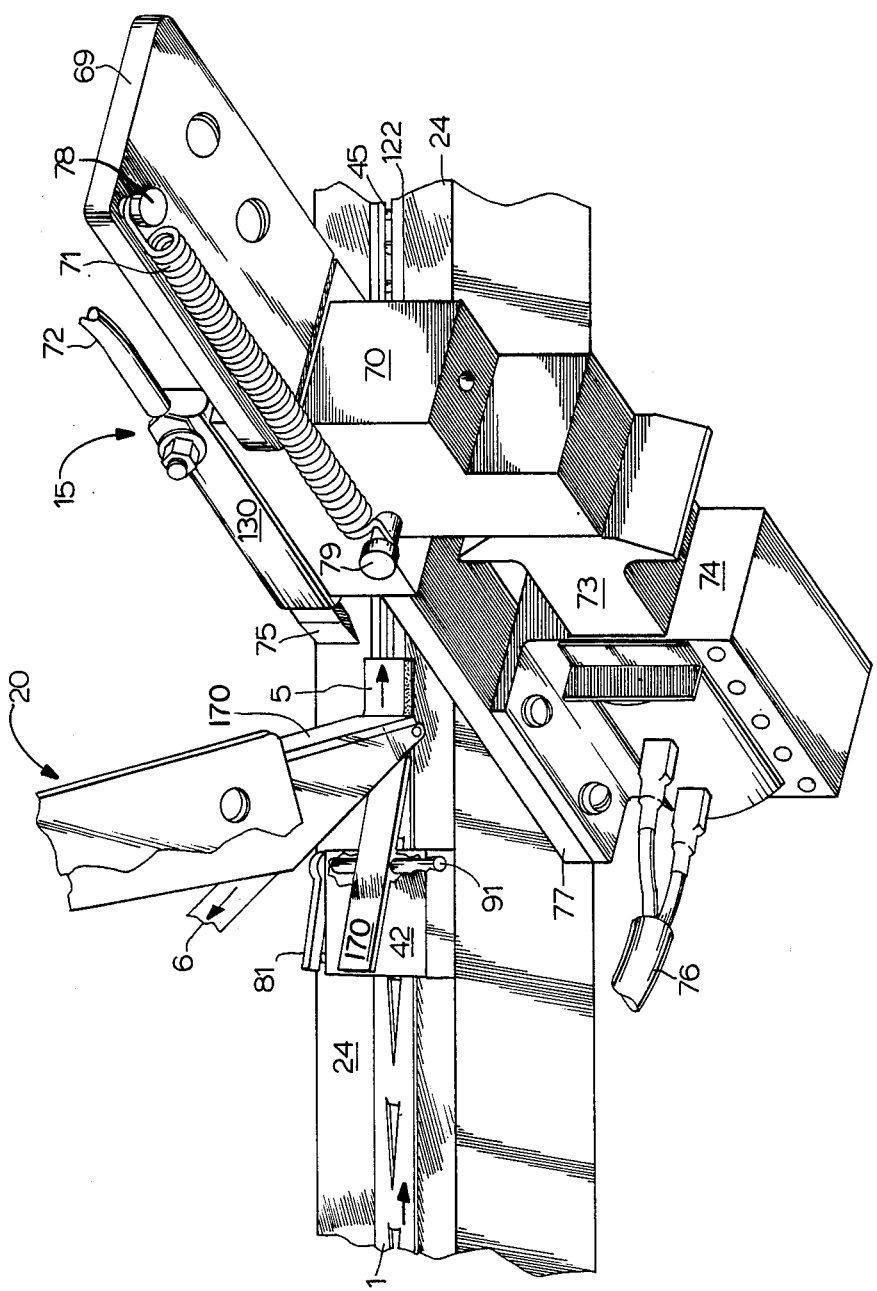
FIGS. 8 and 9 are partial perspective views of the details of the tape feeding and cut-off device of the invention.
Figure 9:
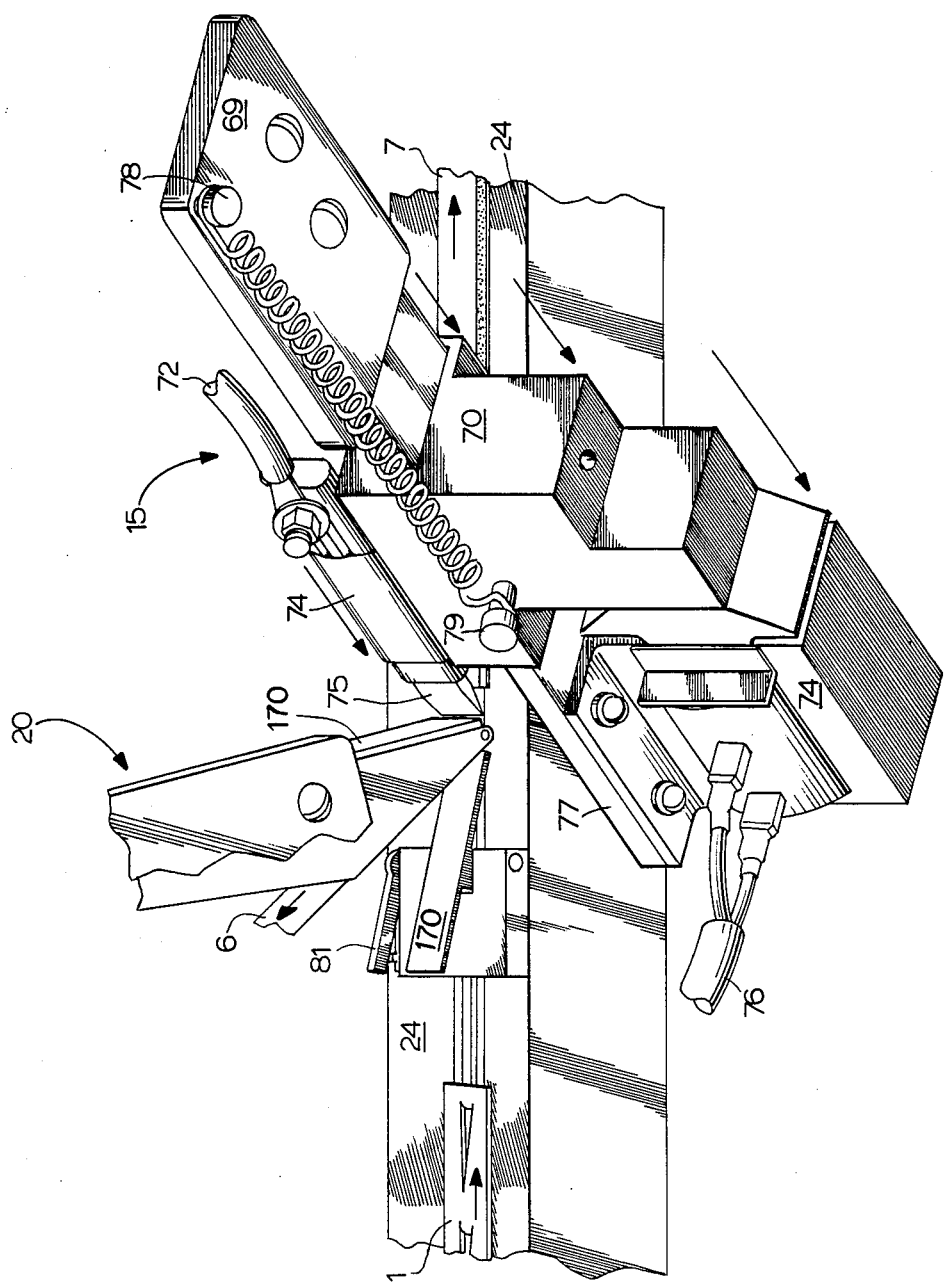

In FIGS. 8 and 9, the tack strip is shown as moving from left to right. In FIG. 4, the flow is from right to left. It will be appreciated that the views presented by FIGS. 8 and 9 are from the direction reverse from as that shown in FIG. 4. Consequently, tack strip is shown as moving from left to right in FIGS. 8 and 9 which is correct, but if viewed from the opposite side, they would be moving from right to left as shown in FIG. 4.

Table member 24 has in it slot 122, as previously explained, into which chain conveyor 45 is disposed. The protruding members 3 of tack strip 2 protrude through the open spaces in chain 45, thus enhancing its conveyance. Feeding device 20 is composed of a body in which there is a channel (not shown) in which tape 4 travels. Disposed over this channel is covered 80. Tape 4 travels down the channel and exits at the lower terminal edge of feeding device 20. Backing 6 is threaded around the terminal edge of lower portion of feeding device 20, threaded through stripping rollers 127-128 and disposed of in a manner previously described. Tape 4, with the adhesive now exposed, is applied to the uppermost surface of tack strip 2 as shown. Feeding of tape 4 is controlled by the two drive rollers 17, actuated through clutch 36 in a manner yet to be described. When tack strip 2 passes under switch housing 42, it raises switch arm 80 and 81. It will be noted that switch arms 80 and 81 are both affixed to axle 91 and pivot thereabout. When switch arms 80-81 are caused to be pivoted about axle 91, clutch 36 is activated and thus activates the feed rollers 17 and the feeding of tape 4, in a manner yet to be described.

Figure 12:
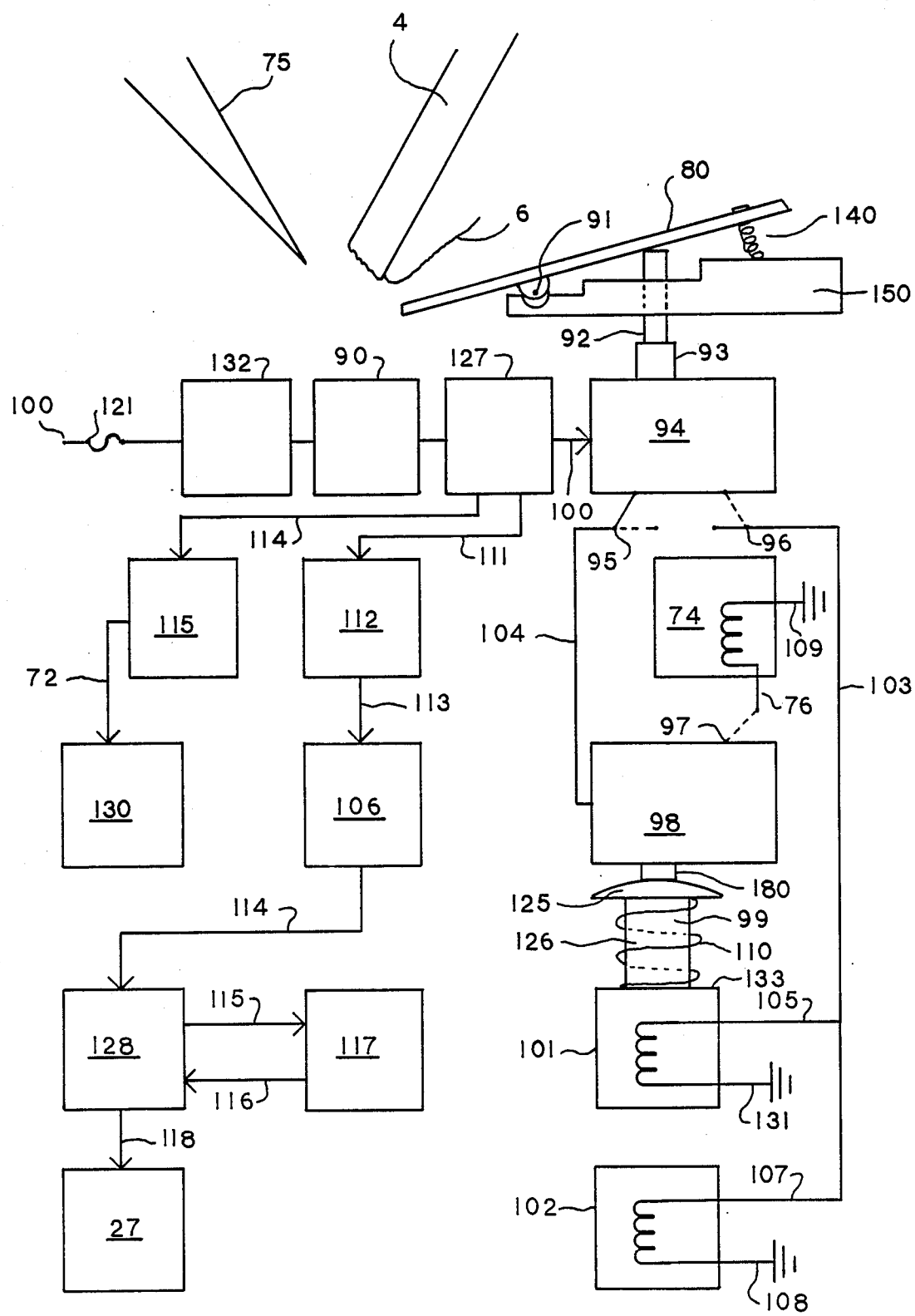
FIG. 12 is a schematic view of the electrical circuit employed in the invention, tack strip not engaged.
Figure 13:
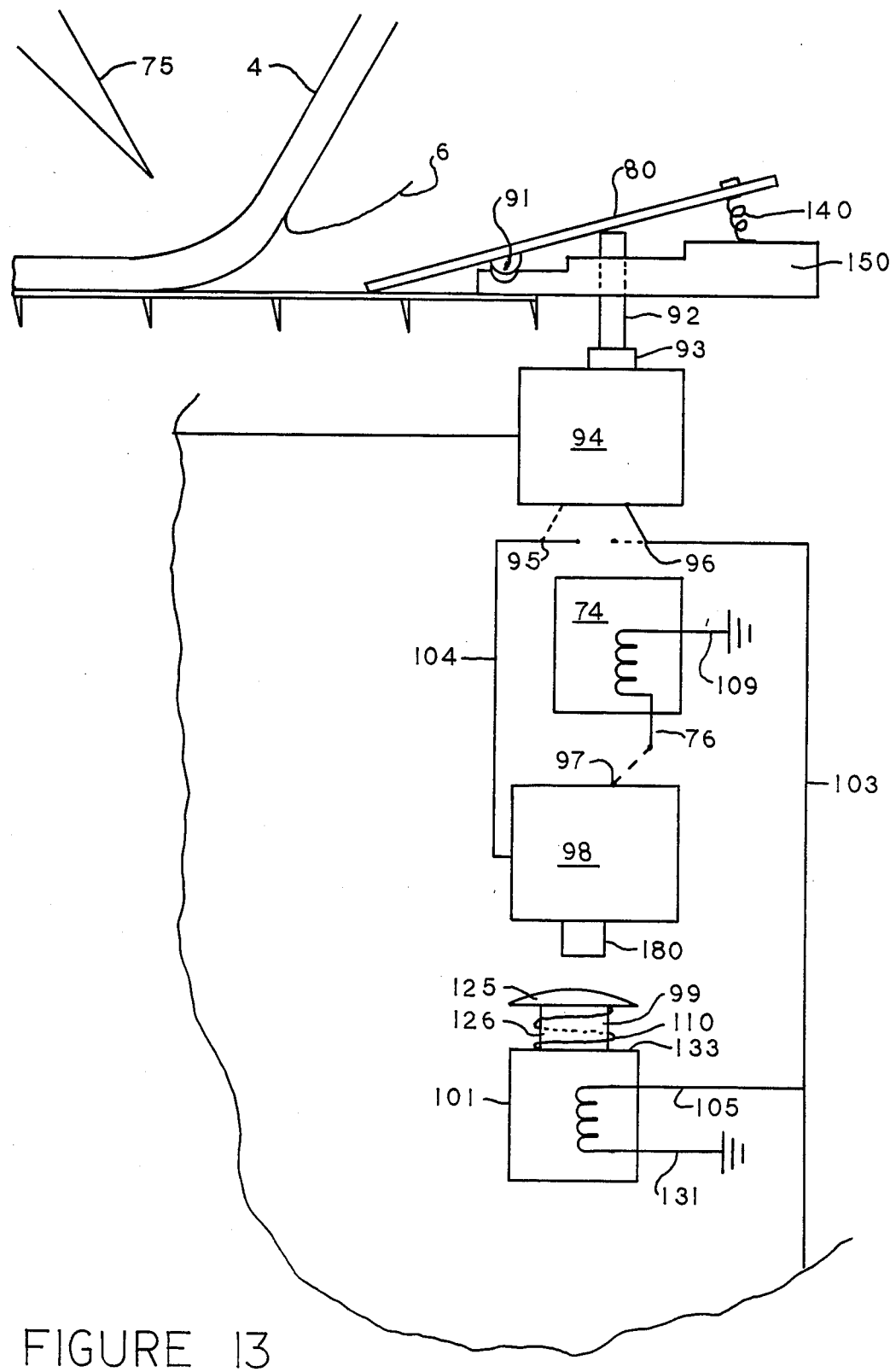
FIG. 13 is a partial schematic view of the electrical circuit of FIG. 12, tack strip engaged.

When the trailing edge of tack strip 2 passes underneath and clears switch arms 80 and 81, cut off device 15 is momentarily activated, causing knife 75 to descend to that position shown in FIG. 9 and then reverse itself to that normal position as shown in FIG. 8. How this knife is activated will be described in explanation in the electrical schematic as shown in FIGS. 12 and 13. Knife 75 is adapted to be heated by heating element 130, which is connected to heating device through lead 72 and goes from a first to a second and then from a second to a first position, as previously explained. It is attached to guiding block 70 as shown. Element 69 is stationary and is not attached to guiding block 70. Guiding block 70 is affixed to plunger 73. Spring 71, by means of fastening means 78 and 79, is attached to element 59 and guiding block 70 respectively. Thus, knife 75 and its guiding block 70 plus plunger 73 are biased to the first position as shown in FIG. 7. When solenoid 74 is activated through electrical lead 76 (in a manner hereinafter explained), plunger 73 is withdrawn from that normal position shown in FIG. 7, to that position shown in FIG. 8. When the current through lead 76 is stopped (to be explained later), then spring 71 causes a plunger 73 and guide block 70 to retract to that position shown in FIG. 8.

One of the problems encountered in automating foam tape application to a tack strip was the problem of backing integrity. Occasionally the backing breaks, i.e., it is not continuous. When this happens, the tape as it is fed onto the tack strip will contain the backing once the break has passed the lowermost or terminal portion of feeding device 20. Thus no adhesion will take place. Thus, some type of mechanism must be provided in order to detect the imperfections (breaks) in the backing 6 at an early stage and stop the machine. This is done by safety switch 16.

Figure 10:
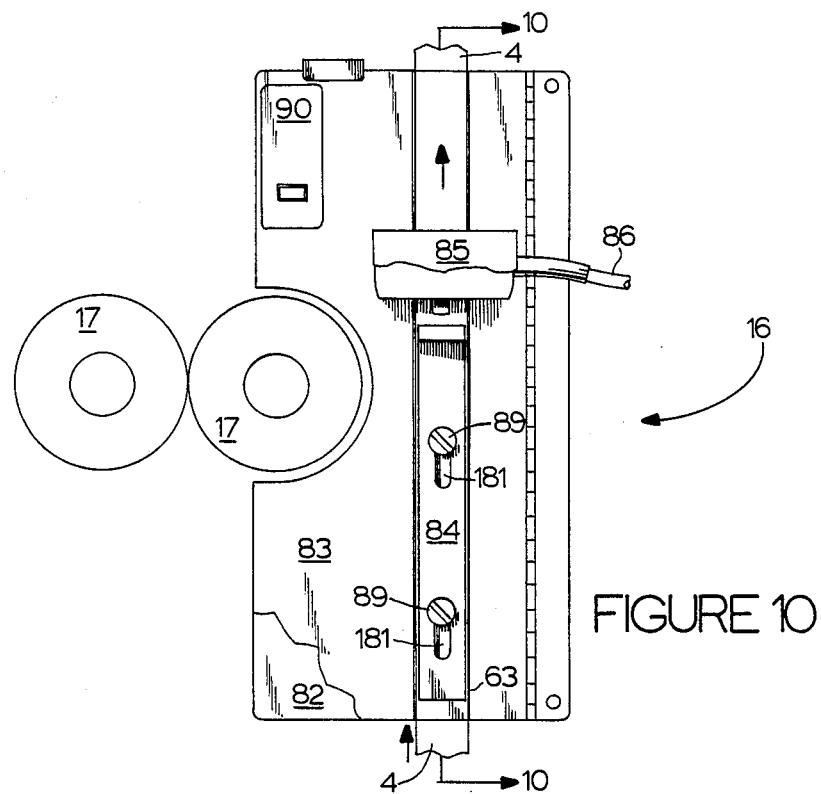
FIG. 10 is a front elevation view of a foam tape safety switch employed in the invention.
Figure 11:
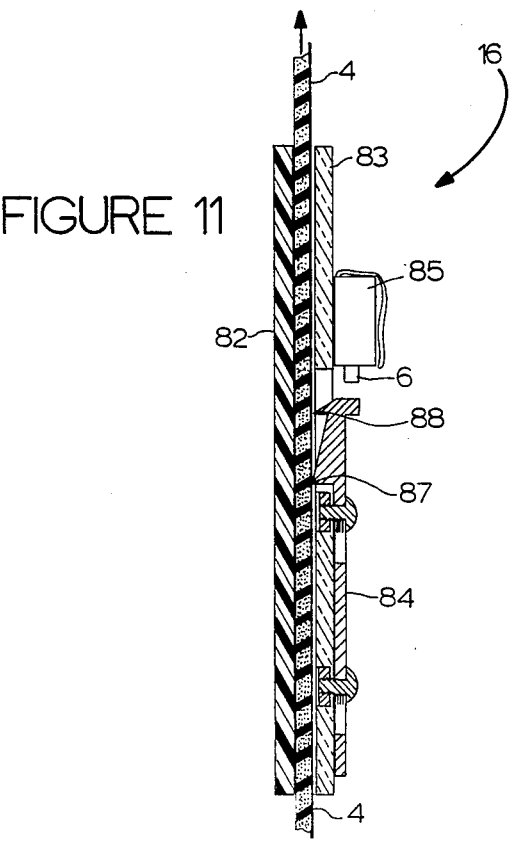
FIG. 11 is a cross section of the safety switch in FIG. 9 along line 10—10.

Turning to FIGS. 10 and 11, safety switch 16 is composed of back plate 82 with a channel 63 in it. Disposed in channel 63 is elongated member 84 which contains slot 181 and is affixed to back plate 82 by means of screws 89 disposed in slots 181. By using this type of structure, elongated element 84 can move upward and downward in a manner delimited by the length of slot 181. Elongated member 84 has two protrusions thereon, namely, protrusions 87 and 88, both of which are adapted to detect and engage any discontinuity or imperfections in backing 6 as tape 4 travels upwardly through element 16. Obviously, tape 4 is oriented so that its underside is directly facing protrusions 87 and 88 on elongated member 84. Disposed above slots 88 is switch 85 which includes plunger 86. When a discontinuity appears in backing 6, either protrusion 87 or 88 engages it and elongated member 84 is thus conveyed from the position shown in FIG. 10 to a position that engages plunger 86 and depresses same (not shown). Once plunger 86 of switch 85 is depressed, the entire apparatus is shut down. See switch 132 of FIGS. 12 and 13. Disposed over tape 4 and channel 63 is a plexiglass cover 83 so that the tape may be protected and viewed while it is traveling. Cover 83 also confines tape 4 to channel 63 during its travel through safety switch 16. Another switch 90 is disposed on plexiglass plate 83 so that if plate 83 is not in its closed position, switch 90 is adapted to keep power from going to motor 27.

Attention now is directed to FIG. 12 and 13. In these figures, the combination of arms 80-81 and the electrical circuit of the invention is shown. It will be noted that when arms 80-81 are pivoted about axle 91, they go from a first to a second position. Arms 80-81 are biased to the first position (FIG. 12) and are moved to their second position (FIG. 13) when the tack strip moves thereunder. When arms 80-81 are in their second position (tack strip under arms 80-81), plunger 92 is depressed, depressing plunger 93 of microswitch 94. Microswitch 94 has two sets of contacts, 95 and 96. Contacts 95 are normally closed and contacts 96 are normally opened. Contacts 96 are connected by lead 103 to sequence solenoid 101 and clutch solenoid 102, both of which are shown connected to ground. Normally closed contacts 95 of switch 94 are connected by lead 104 to a second microswitch 98, which has a single set of normally open contacts 97. When contacts 97 are closed, they complete a path to knife solenoid 74, to ground through lead 109. Sequence solenoid 101 is connected to lead 103 by lead 105 and to ground by lead 131. Sequence solenoid 101 is composed of a conventional solenoid with movable plunger 99. Plunger 99 is composed of a head 125 and a smaller shank 126. Spring 110 is disposed on shank 126 and engages head portion 125 and base 133.

Line current flows through lead 100, fuse 121, safety switch 90, tape control switch 85, and master switch 127 onto line 132 to switch 94. Master switch 127 is connected to by lead 111 to feed switch 112, which is connected by lead 113 to transformer 106. Transformer 106 is connected to relay for track switch to run feed 128, which is connected by leads 115 and 116 to track switch 117. Relay 128 is connected by lead 118 to a feed break motor 27. Master switch 127 is further connected through lead 114 to a hot knife variable control device 115. Through lead 72, the hot knife variable control 115 is connected to the hot knife heater 130.

When tack strip 2 engages the underside of arm switch 80-81, it causes arm switch 80-81 to move upward about pivot about axle 91. This causes movement of plunger 92 to move downward and depress plunger 93 of switch 94. As previously described, switch 94 in its normal state has two sets of contacts, 95 and 96, normally closed and normally opened, respectively. Contact 96, the normally opened contact, is caused to go from its normally opened to a closed state when plunger 93 is depressed. When the normally opened contacts 96 of microswitch 94 are closed, power is then placed on line 103 to cause clutch solenoid 101 to energize, thus causing this clutch to engage the axle 159 and thus drive gears 157, 158, 161, 162 and feed rollers 17. Sequence solenoid 101 is also energizing causing plunger 99 to be depressed against biasing spring 100. This causes plunger 27 of microswitch 98 to be fully extended. Microswitch 98 has one set of contacts 97, which are normally opened. When plunger 180 of microswitch 98 is fully extended, its contacts are closed, causing a path from/through it, over lead 76 through solenoid 74 (an actuator). Stated alternatively, plunger 99 fully extended causes the normally opened contacts 97 of microswitch 98 to become closed, thus providing an electrical path through it to the actuator. The actuator is the hot knife solenoid 74. No current yet flows through the now closed contacts 97 of microswitch 98.

As long as tack strip 2 remains under switch arm 80-81, contacts 96 of microswitch 94 are closed and contacts 95 are open. When trailing edge of tack strip 2 clears the left hand portion of arm switch 80-81, contacts 96 are opened and contacts 95 go to their normally closed state. In this state, power is on line 104, through microswitch 98 contact 97, lead 76 and solenoid 74 and taken off of sequence solenoid 101 causing plunger 99 to react to the spring and travel upward to engage and depress plunger 180, causing contacts 97 to go to its normal state, i.e., open. Current flows over the closed contacts 95 of switch 94, over lead 104 through closed contacts 97 into solenoid 74, during the time plunger 99 travels from its depressed (second) to its extended (first) position, causing knife 75 to be drawn by solenoid 74 to the knife's second position only momentarily. When contacts 97 open (the same time plunger 99 is fully extended striking plunger 180) power on line 76 is cut off causing solenoid 74 to be de-energized and spring 71 to retract knife 75, plunger 73 and block 70. See FIG. 8.

In all cases, it is to be understood that the above-described embodiment is illustrative of one of many possible specific embodiments which may represent the principles of the invention. Numerous and various other embodiments can be devised readily in accordance with these principles by those skilled in the art without departing from the spirit and scope of the invention.

What is claimed is:

1. An apparatus for applying an adhesive strip to a substrate comprising:

(a) a conveyor for conveying said substrate along an elongated path;

(b) a arm biased to a first position, disposed above the conveyor so that said arm comes in contact with said substrate as said substrate is conveyed along said elongated path, movable from said first position to a second position when brought into contact with said substrate and movable from said second to said first position when said arm is not in contact with said substrate;

(c) a feeding device disposed over the conveyor for feeding an adhesive strip to said substrate along a first path;

(d) a cut-off device having a moveable part for cutting said adhesive strip, said moveable part movable from a first position above the substrate to a second position below said substrate in response to said arm being moved from its second to its first position; and, (e) a drive device in communication with said arm responsive to said arm being moved from its first to its second position to cause the drive device to drive said feeding device.

2. The apparatus of claim 1 further including a clutch in communication with said arm, said clutch responsive to said arm being moved from said first to said second position to cause said clutch to be engaged to said feeding device.

3. The apparatus of claim 2 wherein said clutch is responsive to being disengaged from said drive device when said arm is moved from its second to its first position.

4. The apparatus of claim 2 wherein said clutch is responsive to said arm, in the first position, to be disengaged from said feeding device and the arm in the second position to be engaged with the feeding device.

5. The apparatus of claim 1 wherein the cut-off device includes a first switch and first solenoid, said first switch responsive to said arm in its second position to complete a circuit to said first solenoid to activate same, said first solenoid having a moveable plunger, said moveable plunger having a retracted and extended position and is responsive to said first solenoid being activated to move said moveable plunger to its retracted position and responsive to deactivation of said first solenoid to move the moveable plunger to its extended position.

6. The apparatus of claim 5 wherein the cut-off device further includes a second solenoid and a second switch, said second solenoid containing a moveable cut-off member responsive to said second solenoid being activated to be moved from a first to a second position and responsive to the second solenoid being deactivated to be moved from the second to the first position, said second switch responsive to said moveable plunger of said first solenoid in its extended position to create an electrical path to said first solenoid and to activate same.

7. The apparatus of claim 6 wherein said first switch is responsive to said arm in its first position to complete an electrical path to said second switch.

8. The apparatus of claim 7 wherein said moveable plunger is responsive to said arm in its second position to be placed in the moveable plunger's retracted position and said second switch is responsive to the movable plunger in its second position to discontinue the electrical path to said first solenoid.

9. The apparatus of claim 7 wherein said second solenoid of the cut-off device is activated by electrical current through said first and second switches when said arm is in its first position during the time it takes said moveable plunger to travel from its retracted to its extended position.

10. The apparatus of claim 1 wherein the moveable part of said cut-off device includes a knife-like member.

11. The apparatus of claim 10 further including a heater to heat the knife-like member of said moveable part.

12. The apparatus of claim 1 wherein said cut-off device includes a solenoid connected and responsive to said arm being moved from its second to its first position to move the movable part of said cut off device from a first position to a second position.

13. The apparatus of claim 12 wherein said moveable part of said cut-off device is biased towards its first position.

14. The apparatus of claim 1 wherein said conveyor contains a plurality of spaced apart apertures therein adapted to receive a plurality of protrusions protruding from said substrate.

15. The apparatus of claim 14 wherein said conveyor is a continuous chain disposed on two spaced-apart sprockets, one of said sprockets being in engagement with said drive device.

16. The apparatus of claim 1 wherein said feeding device further includes a stripping device for removing a removable backing from said adhesive strip.

17. The apparatus of claim 1 further including a remover, said remover disposed downstream from said cut-off device and adapted to remove the substrate with an adhesive strip applied thereto from the conveyor.

18. The apparatus of claim 1 wherein said adhesive strip has a removable backing thereon and further including a sensor for detecting abnormalities in said adhesive strip, and/or a removable backing thereon, disposed upstream from said feeding device.

19. The apparatus of claim 18 wherein said sensor includes a moveable arm, moveable from a first to a second position, on which there is a protrusion engageable with a surface of said adhesive strip, and/or removable backing thereon, for engaging abnormalities in said adhesive strip and/or a removable backing and moving said movable arm from said first to said second position when said protrusion engages said abnormalities.

20. The apparatus of claim 19 wherein said moveable arm is biased to said first position.

21. The apparatus of claim 19 wherein said moveable arm is in communication with said clutch and said clutch is responsive to said moveable arm being moved from its second to its first position to deactivate said clutch and disengage the drive mechanism from the feeding device.

22. The apparatus of claim 1 wherein said adhesive strip includes a removable backing thereon and said feeding device includes a pulley over which the adhesive strip and removable backing thereon may be disposed, first and second opposing rollers disposed between said pulley and said track for grasping said adhesive strip with said removable backing thereon and conveying same along the first path to cause said adhesive strip absent the removable backing thereon to come in contact with said substrate being conveyed by said conveyor, and second and third opposing rollers spaced apart from said first path for grasping said removable backing, removing same from said adhesive strip prior to said adhesive strip contacting said substrate and conveying said removable backing along a second path.

23. The apparatus of claim 22 further including first and second guide means delimiting said first path, said first guide means disposed between said first and second rollers and said pulley and said second guide means disposed between said conveyor and said first and second rollers.

24. The apparatus of claim 23 further including first and second cover means, said first cover means overlying said first guide means and said second cover overlying said second guide means.

* * * * *